(12) United States Patent
Thiercelin et al.

(10) Patent No.: US 11,029,158 B2
(45) Date of Patent: Jun. 8, 2021

(54) SYSTEM AND METHOD FOR MOVABLE OBJECT TRACKING AND ANALYSIS

(71) Applicant: SZ DJI TECHNOLOGY CO., LTD., Shenzhen (CN)

(72) Inventors: Arnaud Thiercelin, Shenzhen (CN); Dhanushram Balachandran, Shenzhen (CN); Robert Schlub, Shenzhen (CN); Hai Vo, Shenzhen (CN); Di Wu, Shenzhen (CN); Andrew Barinov, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 223 days.

(21) Appl. No.: 16/244,223

(22) Filed: Jan. 10, 2019

(65) Prior Publication Data

US 2019/0145780 A1 May 16, 2019

Related U.S. Application Data

(63) Continuation of application No. PCT/CN2016/089583, filed on Jul. 11, 2016.

(51) Int. Cl.
*G01C 21/20* (2006.01)
*G06F 11/30* (2006.01)
(Continued)

(52) U.S. Cl.
CPC .......... *G01C 21/20* (2013.01); *G06F 11/3058* (2013.01); *G06F 11/3476* (2013.01);
(Continued)

(58) Field of Classification Search
CPC ............................ G06F 11/3476; G01P 15/02
See application file for complete search history.

(56) References Cited

U.S. PATENT DOCUMENTS

2008/0040152 A1  2/2008  Vian et al.
2009/0281756 A1  11/2009  Weed et al.
(Continued)

FOREIGN PATENT DOCUMENTS

CN    105069507 A       11/2015
WO    WO-2016154938 A1 * 10/2016 ............... G07C 5/08

OTHER PUBLICATIONS

The World Intellectual Property Organization (WIPO) International Search Report and Written Opinion for PCT/CN2016/089583 dated Apr. 14, 2017 6 Pages.

*Primary Examiner* — Thomas G Black
*Assistant Examiner* — Tarek Elarabi
(74) *Attorney, Agent, or Firm* — Anova Law Group, PLLC

(57) ABSTRACT

A system for tracking and analyzing performance of a movable object and methods of making and using the same. Movable object performance can be tracked by creating a process log for a movable object manager of the movable object, and creating a movement record of the movable object for comparison to the process log. The process log can include, for example, records of application call processes to a movable object interface, protocol call processes transmitted to and from the movable object, and/or metadata. A movable object event can be analyzed by correlating the process log with the movement record. The present systems and methods are particularly suitable for tracking and analysis of unmanned aerial vehicles (UAV).

20 Claims, 11 Drawing Sheets

(51) Int. Cl.
 *G06F 11/34* (2006.01)
 *G05B 19/042* (2006.01)
 *G01P 15/02* (2013.01)
 *G01S 19/13* (2010.01)

(52) U.S. Cl.
 CPC .............. *G01P 15/02* (2013.01); *G01S 19/13* (2013.01); *G05B 19/042* (2013.01)

(56) References Cited

U.S. PATENT DOCUMENTS

| | | | |
|---|---|---|---|
| 2013/0111273 A1* | 5/2013 | Larsen ................ | G06F 11/3495 714/45 |
| 2014/0180914 A1* | 6/2014 | Abhyanker ............ | G05D 1/102 705/39 |
| 2014/0182375 A1 | 7/2014 | Kim et al. | |
| 2017/0004714 A1* | 1/2017 | Rhee .................... | G08G 5/0086 |

* cited by examiner

SYSTEM AND METHOD FOR MOVABLE OBJECT TRACKING AND ANALYSIS

CROSS-REFERENCE TO RELATED APPLICATION

This application is a continuation of International Application No. PCT/CN2016/089583, filed on Jul. 11, 2016, the entire content of which is incorporated herein by reference.

FIELD

The disclosed embodiments relate generally to movable objects and more particularly, but not exclusively, to systems and methods for tracking movable object performance and analyzing movable object events.

BACKGROUND

Movable objects, such as unmanned aircraft, can be used in many different fields such as film production, sporting events, disaster relief, geological study, and more. Robust and error-free control systems and software ensure safe and effective operation of the movable object. When an unexpected movable object event (such as a crash or collision) does occur, tracking down the precise error that led to the event is important. In particular, it is useful to be able to distinguish between errors that arise from faulty user programming versus API or other back-end errors. However, there currently lacks suitable methods for precisely tracking and analyzing input signals that lead to specific movable object events.

Accordingly, there is a need for improved systems and methods for tracking movable object performance and analyzing movable object events.

SUMMARY

In accordance with a first aspect disclosed herein, there is set forth a method of tracking performance of a movable object, comprising: creating a process log for a movable object manager of the movable object, the movable object manager operating in a software environment; and creating a movement record of the movable object for comparison to the process log.

In accordance with another aspect disclosed herein, there is set forth a method of movable object event analysis, comprising: obtaining a process log for a movable object manager of a movable object, the movable object manager operating in a software environment; obtaining a movement record of the movable object; and analyzing a movable object event of the movable object by correlating the process log with the movement record.

In accordance with another aspect disclosed herein, there is set forth a movable object, comprising: one or more processors configured for creating a process log for a movable object manager of the movable object, the movable object manager operating in a software environment, and creating a movement record of the movable object for comparison to the process log.

In accordance with another aspect disclosed herein, there is set forth a non-transitory computer-readable medium with instructions stored thereon that, when executed by a processor, perform the steps comprising: obtaining a process log for a movable object manager of a movable object, the movable object manager operating in a software environment; obtaining a movement record of the movable object; and analyzing a movable object event of the movable object by correlating the process log with the movement record.

In accordance with another aspect disclosed herein, there is set forth a system of movable object event analysis, comprising: one or more microprocessors; and an analyzer running on the one or more microprocessors, wherein the analyzer operates to: obtain a process log for a movable object manager of a movable object, the movable object manager operating in a software environment; obtain a movement record of the movable object; and analyze a movable object event of the movable object by correlating the process log with the movement record.

In accordance with another aspect disclosed herein, there is set forth a non-transitory computer-readable medium with instructions stored thereon that, when executed by a processor, perform the steps comprising: creating a process log for a movable object manager of the movable object, the movable object manager operating in a software environment; and creating a movement record of the movable object for comparison to the process log.

Figure 1:
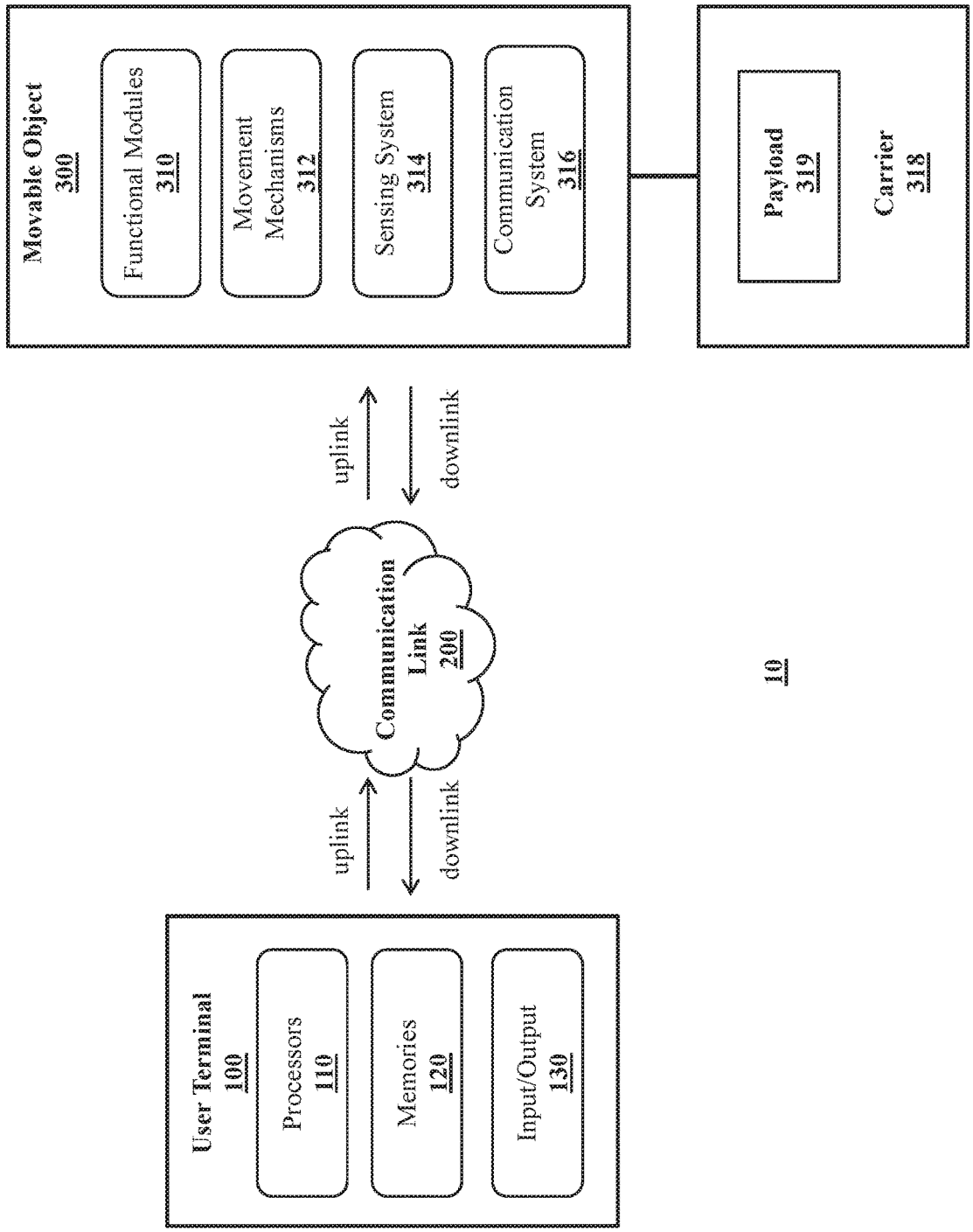
FIG. 1 is an exemplary top-level block diagram illustrating an embodiment of a movable object operation system that includes a user terminal in communication with a movable object through a communication link.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE
PREFERRED EMBODIMENTS

The present disclosure sets forth systems and methods for tracking movable object performance and analyzing movable object events, which overcome limitations of prior systems and methods. More particularly, the present systems and methods relate to the creation of a "process log" for tracking movable object processes that control the movable object. The information in the process log can enable analysis of the movable object by correlation with a movement record of the movable object, either in real time or after operation of the movable object. Exemplary embodiments of the present systems and methods are described below.

Turning now to FIG. 1, an exemplary movable object operation system 10 is shown in accordance with various embodiments of the present systems and methods. The movable object operation system 10 can include a user terminal 100, which can communicate with a movable object 300 via a communication link 200.

The user terminal 100 can be configured to interact with a user (not shown) to operate the movable object 300 and/or present data collected by the movable object 300 to the user. The user terminal 100 can include, for example, remote controllers (not shown), portable computers, laptops, mobile devices, handheld devices, mobile telephones (for example, smartphones), tablet devices, tablet computers, personal digital assistants, handheld consoles, portable media players, wearable devices (for example, smartwatches and head-mounted displays), and the like.

As shown in FIG. 1, the user terminal 100 (and/or components thereof) can include one or more processors 110 that can be used to execute software. The user terminal 100 can include any number of processors 110, as desired. Without limitation, each processor 120 can include one or more general purpose microprocessors (for example, single or multi-core processors), application-specific integrated circuits (ASIC), field-programmable gate arrays (FPGA), application-specific instruction-set processors, digital signal processing units, coprocessors, network processing units, audio processing units, encryption processing units, and the like. The processors 110 can be configured to perform any of the methods described herein, including but not limited to a variety of tasks relating to mobile object control, tracking, and analysis. In some embodiments, the processors 110 can include specialized software and/or hardware, for example, for processing movable object tasks using an interface. In some embodiments, the processors 110 can execute an analyzer that operates to perform any of the methods described herein.

As shown in FIG. 1, the user terminal 100 can include one or more memories 120 (alternatively referred to herein as non-transient computer readable media). Suitable memories 120 can include, for example, random access memory (RAM), static RAM, dynamic RAM, read-only memory (ROM), programmable ROM, erasable programmable ROM, electrically erasable programmable ROM, flash memory, secure digital (SD) card, and the like. Instructions for performing any of the methods described herein can be stored in the memory 120. The memory 120 can be placed in operative communication with the processors 110, as desired, and instructions can be transmitted from the memory 120 to the processors 110 for execution, as desired.

The user terminal 100 can additional have one or more input/output devices 130, such as buttons, a keyboard, keypad, trackball, displays, and/or a monitor. Various user interface elements (for example, windows, buttons, menus, icons, pop-ups, tabs, controls, cursors, insertion points, and the like) can be used to present data to and receive data from a user (not shown).

The user terminal 100 can be configured for communication with the movable object 300 via the communication link 200. As shown in FIG. 1, the communication link 200 can include an uplink for transmitting data (such as control data and application data) from the user terminal 100 to the movable object 300, and a downlink for transmitting data (such as telemetry data, application data, image data, and video data) from the movable object 300 to the user terminal. In some embodiments, the uplink and downlink can share a single frequency using time modulation. In other embodiments, the uplink and downlink can use different frequencies. In some embodiments, the communication link 200 can be configured to transmit signals according to a movable object protocol 250 (shown in FIG. 3).

In some embodiments, the communication link 200 can be a wireless communication link 200 over a wireless network. Suitable wireless communications can include, for example, radio, Wireless Fidelity (WiFi), cellular, satellite, and broadcasting. In certain embodiments, the communication link 200 can be implemented over a 3G, 4G, or 5G mobile telecommunications network. Exemplary wireless communication technologies that are suitable for the present systems and methods include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

In some embodiments, the communication link 200 can advantageously be encrypted to prevent third party intrusion into movable object operations. Suitable encryption methods include, but are not limited to, interne key exchange, Internet Protocol Security (IPsec), Kerberos, point-to-point protocol, transport layer security, SSID hiding, MAC ID filtering, Static IP addressing, 802.11 security, Wired Equivalent Privacy (WEP), Wi-Fi Protected Access (WPA), WPA2, Temporal Key Integrity Protocol (TKIP), Extensible Authentication Protocol (EAP), Lightweight Extensible Authentication Protocol (LEAP), Protected Extensible Authentication Protocol (PEAP), and the like.

In various embodiments, the movable object 300 for the present systems and methods can include a carrier and a payload. Although the movable object 300 is described generally as an aircraft, this is not intended to be limiting, and any suitable type of movable object can be used, including bicycles, automobiles, trucks, ships, boats, trains, helicopters, aircraft, robotic devices, various hybrids thereof, and the like. One of skill in the art would appreciate that any of the embodiments described herein in the context of aircraft systems can be applied to any suitable movable object.

In some embodiments, the movable object 300 can be an unmanned aerial vehicle (UAV) 320. Colloquially referred to as "drones," UAVs 320 include aircraft without a human pilot onboard the vehicle whose flight is controlled autonomously or by a remote pilot (or sometimes both). UAVs 320 are now finding increased usage in civilian applications involving various aerial operations, such as data-gathering or delivery. The present movable object operation systems and methods are suitable for use with many types of UAVs 320 including, without limitation, quadcopters (also referred to a quadrotor helicopters or quad rotors), single rotor, dual rotor, trirotor, hexarotor, and octorotor rotorcraft UAVs 320, fixed wing UAVs 320, and hybrid rotorcraft-fixed wing UAVs 320.

The movable object 300 can include or more functional modules 310 that can carry out, for example, movement, communication, imaging, and/or other functionality. For example, functional modules of the movable object 300 can include one or more movement mechanisms 312 (for example, propulsion mechanisms), a sensing system 314, and a communication system 316. The movable object 300 is further shown as having a carrier 318 that includes a payload 319. Functional modules 310 of a UAV 320 can include, for example, a flight control module for controlling flight operations, a gimbal module for precise rotational and/or translational positioning of mounted objects, and a camera module for capturing image and video information from the surroundings of the UAV 320. The movable object 300 can further include hardware components such as processors, memories, etc., as desired.

The movement mechanisms 312 can include one or more of rotors, propellers, blades, engines, motors, wheels, axles, magnets, nozzles, animals, or persons. For example, the movable object 300 can have one or more propulsion mechanisms. The movement mechanisms 312 can all be of the same type. Alternatively, the movement mechanisms 312 can be different types of movement mechanisms 312. The movement mechanisms 312 can be mounted on the movable object 300 (or vice-versa), using any suitable means such as a support element (for example, a drive shaft). The movement mechanisms 312 can be mounted on any suitable portion of the movable object 300, such on the top, bottom, front, back, sides, or suitable combinations thereof.

In some embodiments, the movement mechanisms 312 can enable the movable object 300 to take off vertically from a surface or land vertically on a surface without requiring any horizontal movement of the movable object 300 (for example, without traveling down a runway). Optionally, the movement mechanisms 312 can be operable to permit the movable object 300 to hover in the air at a specified position and/or orientation. One or more of the movement mechanisms 312 can be controlled independently of the other movement mechanisms 312. Alternatively, the movement mechanisms 312 can be configured to be controlled simultaneously. For example, the movable object 300 can have multiple horizontally oriented rotors that can provide lift and/or thrust to the movable object 300. The multiple horizontally oriented rotors can be actuated to provide vertical takeoff, vertical landing, and hovering capabilities to the movable object 300. In some embodiments, one or more of the horizontally oriented rotors can spin in a clockwise direction, while one or more of the horizontally rotors can spin in a counterclockwise direction. For example, the number of clockwise rotors can be equal to the number of counterclockwise rotors. The rotation rate of each of the horizontally oriented rotors can be varied independently in order to control the lift and/or thrust produced by each rotor, and thereby adjust the spatial disposition, velocity, and/or acceleration of the movable object 300 (for example, to up to three degrees of translation and up to three degrees of rotation).

The sensing system 314 can include one or more sensors that can sense the spatial disposition, velocity, and/or acceleration of the movable object 300 (for example, with respect to various degrees of translation and various degrees of rotation). The one or more sensors can include sensors such as global positioning system (GPS) sensors, motion sensors, inertial sensors (for example, inertial measurement units (IMU)), proximity sensors, image sensors, attitude and heading reference systems (AHRS), radar sensors, lidar sensors, ultrasound sensors, infrared sensors, as well as other sensors that detect motion by optics, radio, sound, vibration, magnetism, and the like. Sensing data provided by the sensing system 314 can be used to control the spatial disposition, velocity, and/or orientation of the movable object 300 (for example, using a suitable processing unit and/or control module). Alternatively, and/or additionally, the sensing system 314 can be used to provide data regarding the environment surrounding the movable object, such as weather conditions, proximity to potential obstacles, location of geographical features, location of manmade structures, and the like.

The communication system 316 can enables communication with the user terminal 100 via the communication link 300, which can include various wired and/or wireless technologies as discussed above. The communication system 316 can include any number of transmitters, receivers, and/or transceivers suitable for wireless communication. The communication can be one-way communication, such that data can be transmitted in only one direction. For example, one-way communication can involve only the movable object 300 transmitting data to the user terminal 100, or vice-versa. The data can be transmitted from one or more transmitters of the communication system 316 to one or more receivers of the user terminal 100, or vice-versa. Alternatively, the communication can be two-way communication, such that data can be transmitted in both directions between the movable object 300 and the user terminal 100. The two-way communication can involve transmitting data from one or more transmitters of the communication system 316 to one or more receivers of the user terminal 100, and vice-versa.

In some embodiments, the user terminal 100 can provide control data to one or more of the movable object 300, carrier 318, and payload 319 and receive information from one or more of the movable object 300, carrier 318, and payload 319 (for example, position and/or motion information of the movable object, carrier or payload; data sensed by the payload such as image data captured by a payload camera; and data generated from image data captured by the payload camera). In some instances, control data from the user terminal 100 can include instructions for relative positions, movements, actuations, or controls of the movable object, carrier, and/or payload. For example, the control data can result in a modification of the location and/or orientation of the movable object (for example, via control of the movement mechanisms 312), or a movement of the payload with respect to the movable object (for example, via control of the carrier 318). The control data from the application can result in control of the payload 319, such as control of the operation of a camera or other imaging device (for example, taking still or moving pictures, zooming in or out, turning on or off, switching imaging modes, change image resolution, changing focus, changing depth of field, changing exposure time, changing viewing angle or field of view). Although embodiments can be described that include a camera or other image capture device as payload, any payload can be used with embodiments of the present invention. In some embodiments, an application can be configured to control a particular payload.

In some instances, the communications from the movable object, carrier and/or payload can include information from one or more sensors (for example, of the sensing system 314 or of the payload 319) and/or data generated based on the sensing information. The communications can include sensed information from one or more different types of sensors, as described above. Such information can pertain to the position (for example, location or orientation), movement, or acceleration of the movable object, carrier, and/or payload. Information from a payload 319 can include data captured by the payload 319 or a sensed state of the payload 319.

Figure 2:
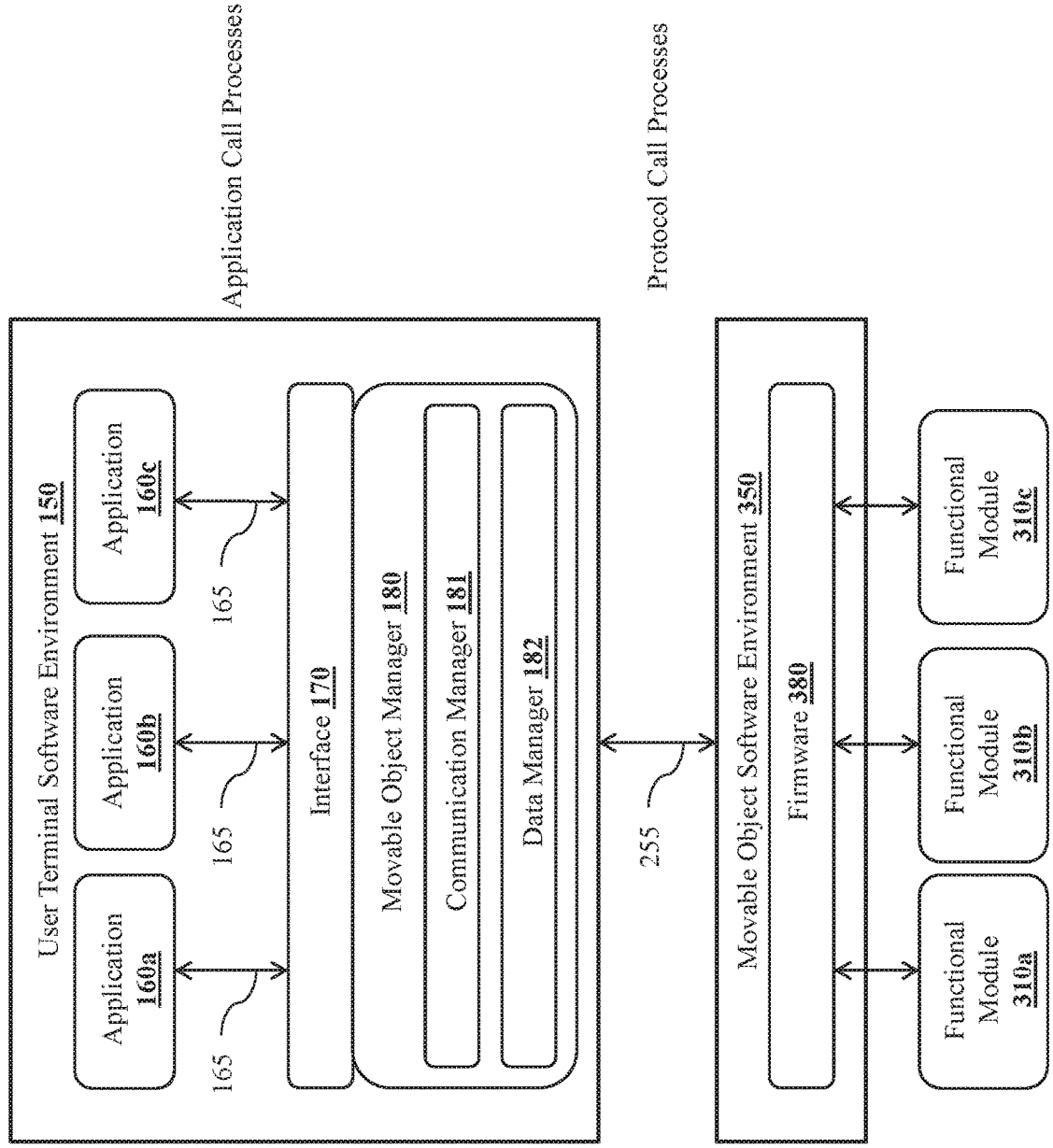
FIG. 2 is an exemplary diagram illustrating an embodiment of a software environment of the movable object operation system of FIG. 1.

Turning now to FIG. 2, an exemplary software environment 50 of the movable object operation system 10 is shown. This exemplary software environment 50 is shown as including a user terminal software environment 150 that corresponds to a user terminal 100 (shown in FIG. 1), as well as a movable object software environment 350 that corresponds to a movable object 300 (shown in FIG. 1). The software environment 50 can be configured using any convenient programming language, such as Java, C, C++, Python, and the like. The software environment 50 can be operated using any appropriate hardware as described above.

As shown, the user terminal software environment 150 can include one or more applications 160a, 160b, and 160c that are installed on the user terminal 100. Where the user terminal 100 is a mobile device, the application 160 can be colloquially referred to as an "app." The app can be made available by a vendor and kept updated by the vendor through, for example, a mobile app store.

In some embodiments, the applications 160a, 160b, and 160c can be individually or collectively configured to invoke an interface 170. For example, the interface 170 can be an application programming interface (API) that includes one or more defined elements such as functions, methods, procedures, parameters, constants, variables, objects, modules, datatypes, exceptions, etc.

The applications 160a, 160b, and 160c can interact with the elements of the interface 170 through application call processes 165, as shown. For example, an application call process 165 can be a method call that is made by an application 160 to the interface 170 to retrieve a value of a particular variable. Another exemplary application call process 165 is a method call to the interface 170 that commands the movable object 300 to perform one or more movable object tasks. A movable object task invoked using the interface 170 can be a simple task (for example, move the movable object 300 to point A) or a complex task (move the movable object 300 from point A to point B while a camera of the movable object 300 follows and films an external scene of interest). An application call process 165 can invoke and interact with specific objects in the software environment 50, such as a Component object representing a functional module 310, or a Mission object representing a defined sequence of movable object tasks.

In some embodiments, the interface 170 can be part of a movable object software development kit (SDK). The movable object SDK can advantageously provide common, integrated functionality for applications 160 that interact with movable objects 300. For example, applications 160 that are used to control a flying movable object 300 can invoke functions in the movable object SDK for controlling navigation of the flying movable object 300. Applications 160 relating to imaging from a movable object 300 can invoke functions in the movable object SDK for controlling a camera or gimbal mechanism of the movable object 300.

In some embodiments, the movable object 300 can be managed using a movable object manager 180. The movable object manager 180 can be located anywhere that is convenient. Though the movable object manager 180 is depicted as being a part of the user terminal software environment 150 in FIG. 2 for illustrative purposes only, the movable object manager 180 is not limited in locality or implementation. In some embodiments, the movable object manager 180 can be part of the movable object software environment 350, or part of another software environment. The movable object manager 180 can be configured with logic for determining when communication with the movable object 300 is necessary, and when such communication is unnecessary.

The movable object manager 180 can be configured to manage the movable object 300 by handling application call processes 165 received through the interface 170. The movable object manager 180 can convert the received application call processes 165 into commands to the movable object 300. Additionally, the movable object manager 180 can issue commands to the movable object 300 that are not triggered through the interface 170. For example, the movable object manager 180 can perform background tasks that relate to maintaining movable object performance (such as maintaining altitude, pitch, or heading of a flying movable object 300, checking that the movable object 300 has sufficient fuel remaining, or automatically directing the movable object to avoid restricted zones such as airports).

The movable object manager 180 can include a communication manager 181 for communicating with the movable object 300, and/or a data manager 182 for receiving, sending, and processing data and/or commands in relation to the movable object 300. In some embodiments, the movable object manager 180 can be configured to communicate with an authentication server 950 (shown in FIG. 9) for providing a secure environment for communication between the user terminal 100 and the movable object 300.

In some embodiments, communication between the user terminal 100 and the movable object 300 can be conducted using protocol call processes 255 that are transmitted back and forth between the user terminal 100 and the movable object 300. The protocol call processes can be transmitted according to a movable object protocol 250 (shown in FIG. 3). The protocol call processes 255 can include structured data that encodes signals for the movable object 300 to take specific actions, or signals from the movable object 300 indicating present status.

The protocol call processes 255 can advantageously be encrypted to avoid third-party intrusion and unwanted interference with movable object operations. In such cases, the protocol call processes 255 can be configured to be decrypted only by verified or trusted users. In some embodiments, the protocol call processes 255 can be formatted according to a proprietary format that is decipherable only by a designer or manufacturer of the movable object 300. Consequently, the protocol call processes 255 can be made opaque to users, and decipherable only by the designer or manufacturer for troubleshooting purposes.

As shown in FIG. 2, signals received by the movable object 300 can be processed by firmware 380 within the movable object software environment 350. The firmware 380 can reside, for example, in a read-only memory of the movable object 300. The firmware 380 can be configured to decode protocol call processes 255 received from the user terminal 100, and send corresponding signals to the appropriate functional modules 310a, 310b, and 310c of the movable object 300. Accordingly, the protocol call processes 255 can be translated directly into physical action by the functional modules 310 of the movable object 300.

Figure 3:
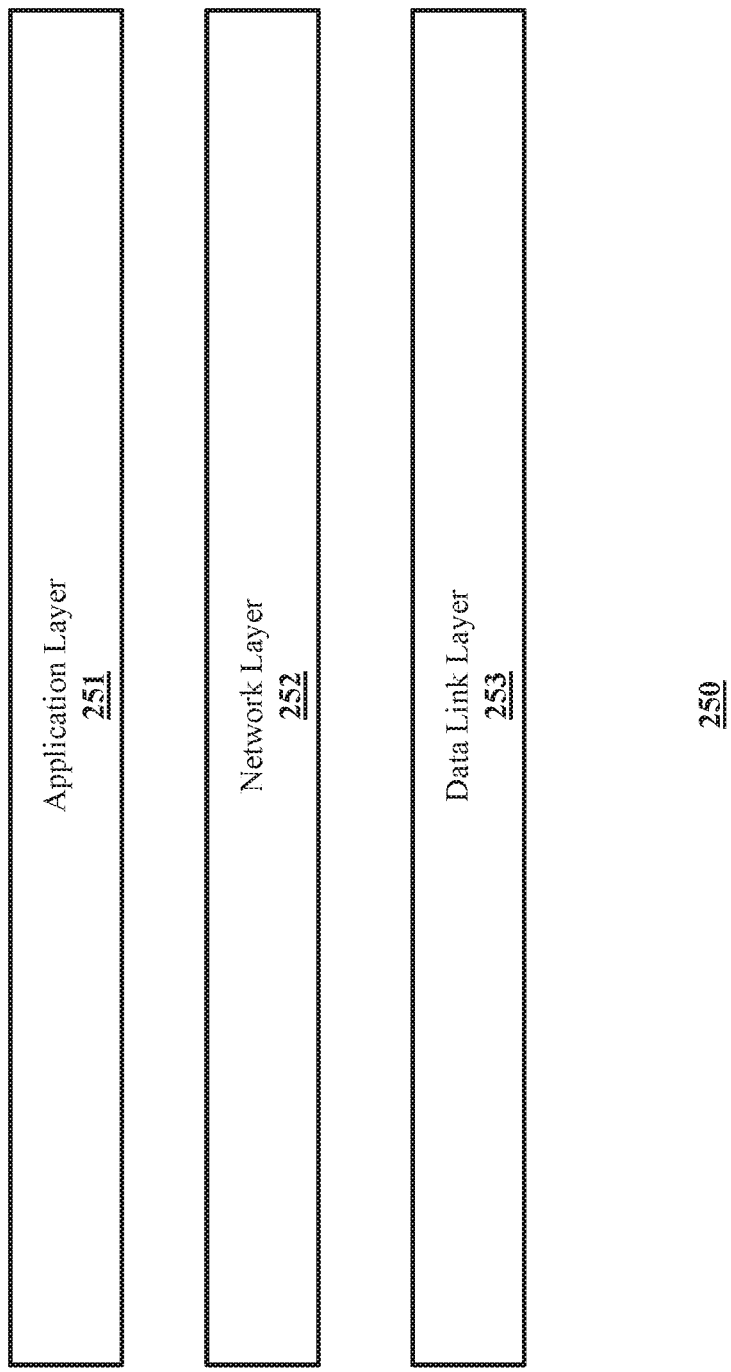
FIG. 3 is an exemplary diagram illustrating an embodiment of a communication protocol for use with the movable object operation system of FIG. 1.

Turning now to FIG. 3, an exemplary movable object protocol 250 for the communication link 200 (shown in FIG. 1) is shown in accordance with various embodiments of the present systems and methods. The movable object protocol 250 can include an application layer 251, a network layer 252, and a data link layer 253. The application layer 251 can be used, for example, for handling application logic, such as controlling behavior of functional modules 310 of a movable object 300 (shown in FIG. 1). The network layer 252 can be used, for example, for supporting data packet routing and relaying. The data link layer 253 can be used, for example, for handling data framing, data verification, and data retransmission.

In some embodiments, the movable object protocol 250 can support communication between various modules of a UAV 320, such as a flight control module, gimbal module, camera module and/or other modules. The movable object protocol 250 can be used with different communication link technologies, such as a universal asynchronous receiver/transmitter (UART) technology, a controller area network (CAN) technology, and an inter-integrated circuit (I2C) technology.

Figure 4:
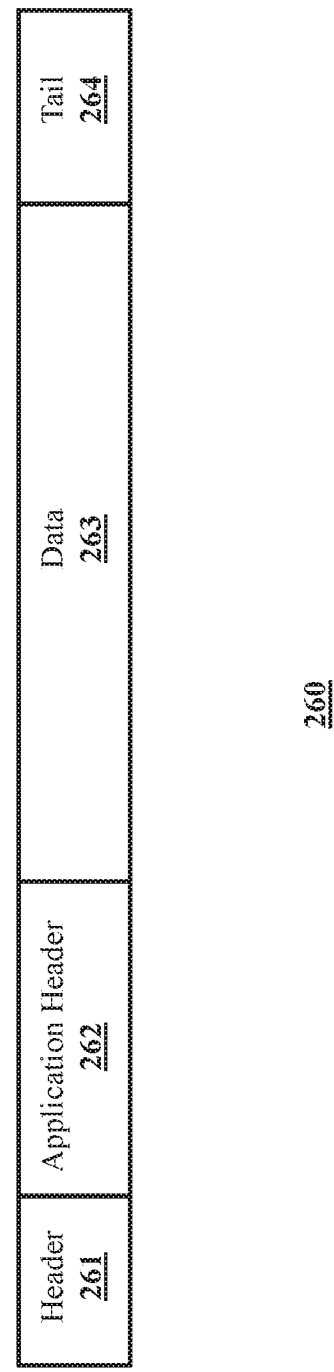
FIG. 4 is an exemplary diagram illustrating an embodiment of a data packet for use with the movable object operation system of FIG. 1.

Communications can be made using the movable object protocol 250 through transmission of packets 260 through the communication link 200. An exemplary packet 260 is shown in FIG. 4. The packet 260 can include a header 261, an application header 262, data 263, and a tail 264. The header 261 and tail 264 can include, for example, control information that a network needs for delivering the data 263. For example, the control information can include source and destination network addresses, error detection codes, and packet sequencing information. The application header 262 can include, for example, various sender and receiver information. For example, the sender and receiver can be among different functional modules 310 on the movable object 300 and applications 160 on the user terminal 100 (shown in FIG. 1).

Figure 5:
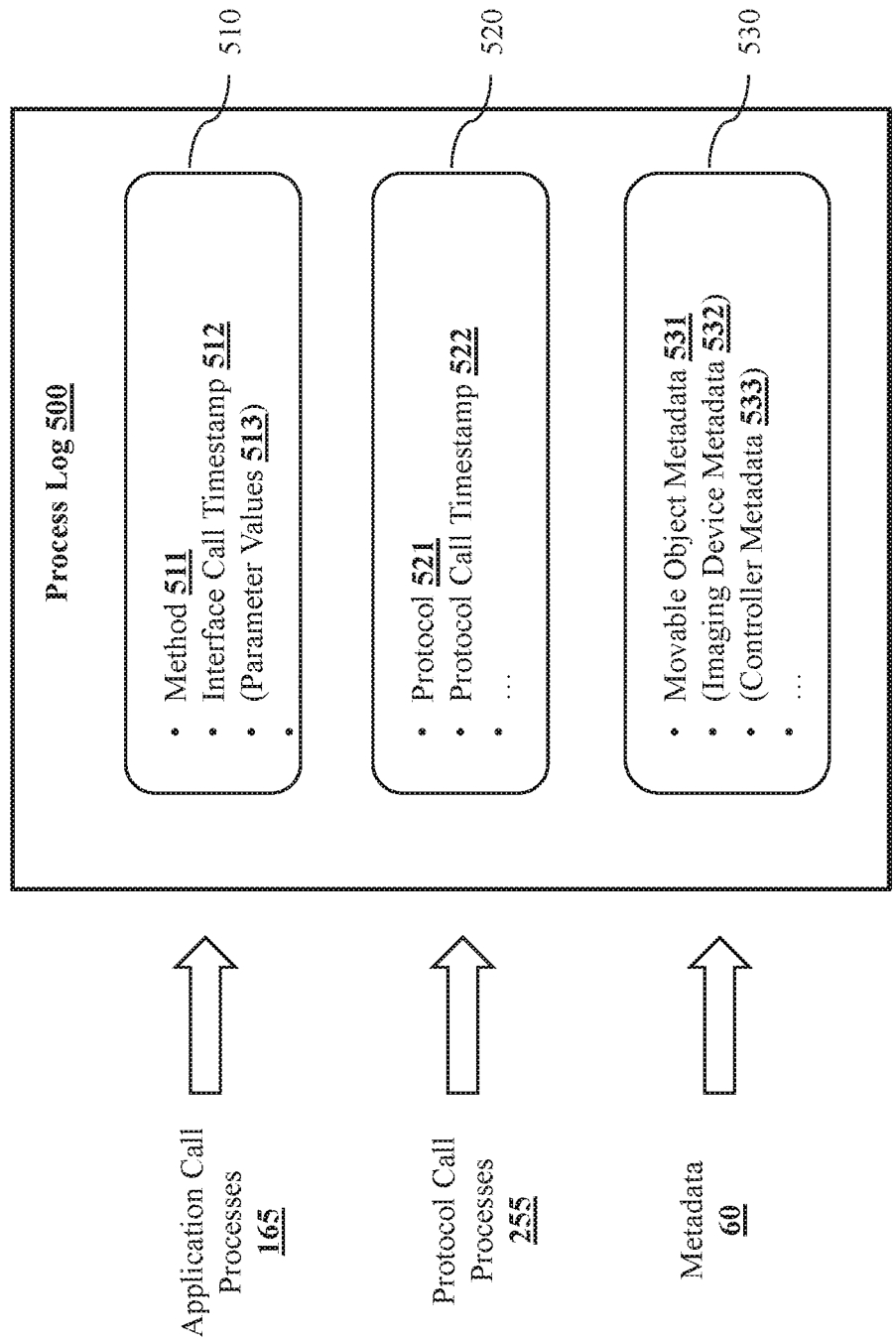
FIG. 5 is an exemplary block diagram illustrating an embodiment of a process log created by the movable object operation system of FIG. 1.

Turning now to FIG. 5, an exemplary process log 400 is shown as including one or more records of processes of a movable object 300 (shown in FIG. 1). The process log 400 can be configured to include any information concerning operation of the movable object 300, including any and all processes within a software environment 50, such as a user terminal software environment 150 or a movable object software environment 350.

The process log 400 can include a first record 510 that includes application call processes 165, which are invoked by an application 160 to an interface 170. For example, the interface 170 can includes a getMovableObjectStatus( ) method that returns a string value (e.g., "inactive," "normal," or "warning") indicative of a present status of the movable object 300. The first record 510 can include the method 511 ("getMovableObjectStatus( )"), as well as an application call timestamp 512 of the corresponding application call process 165 invoking the method 511. The first record 510 can further optionally include, for example, one or more parameter values of the application call process 165 (none, or "void" in the above example). The first record 510 can also optionally include a return value ("inactive," "normal," or "warning" in the above example), and/or an identifier of the application 160 originating the application call process 165. In some embodiments, first record 510 can be written in a cleartext (or unencrypted) format. In other embodiments, first record 510 can be encrypted, as desired.

The process log 400 can further include a second record 520 that includes protocol call processes 255, which can be sent between a user terminal 100 and a movable object 300. The protocol call process 255 can be made in accordance with a movable object protocol 250, as described above with respect to FIGS. 3 and 4. The data of each protocol call process can be represented as a protocol 521 entry in the second record 520. Each protocol 521 entry is preferably accompanied by a corresponding protocol call timestamp 522. The second record 520 is preferably written in an encrypted and/or proprietary format to avoid unwanted intrusion by third parties, which can disrupt operation of the movable object 300.

The process log 400 can further include a third record 530 that includes metadata 60. The metadata 60 can include any data which gives context to the performance of the movable object 300. The metadata 60 can include movable object metadata 531 (for example, the make, model, or serial number of the movable object 300). The metadata 60 can also include metadata regarding functional modules 310 of the movable object 300, and/or other objects associated with the movable object 300. For example, the metadata 60 can include information regarding an application 160 that is used to interact with or control the movable object 300, such as a name or version of the application 160. The metadata 60 can include information regarding an interface 170 used by the movable object 300, such as a name or version of a movable object SDK. The metadata 60 can further include information regarding a user terminal 100 (for example, make and model of a mobile device or remote control). The metadata 60 can further include information regarding hardware components installed aboard the movable object 300 (for example, cameras, processors, motors, inertial measurement units, and the like).

Figure 6:
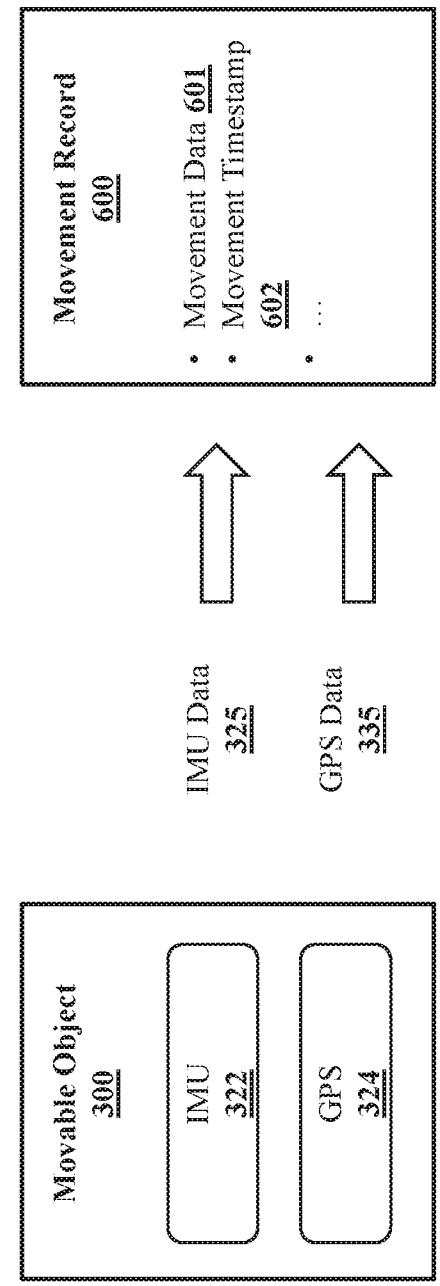
FIG. 6 is an exemplary block diagram illustrating an embodiment of a movement record obtained by the movable object operation system of FIG. 1.

Turning now to FIG. 6, a movement record 600 is shown in relation to a corresponding movable object 300. The movement record 600 can include one or more movement data 601 entries. The movement data describes movement history of the movable object 300, such as past position, velocity, and acceleration of the movable object 300. The movement data 601 can be obtained from various sources. For example, the movement data 601 can be obtained by a user observation of the movable object 300 (such as "the drone flew straight ahead for 5 minutes"). In some embodiments, the movement data 601 can be obtained from a motion sensor. Exemplary motion sensors for the present systems and methods are described above with respect to FIG. 1.

For example, the movement data 601 can be obtained from an IMU 322 installed onboard the movable object 300, which can track a history of the linear and/or angular acceleration of the movable object 300. Alternatively, and/or additionally, the movement data 601 can be obtained from a GPS 324, which can track positions of the movable object 300. Corresponding IMU data 325 and/or GPS data 335 can be transmitted from the movable object 300 to a user terminal 100 or other location, as appropriate. The movement data 601 can be accompanied by appropriate movement timestamps 602 indicative of the time that the movement data was taken, indicating the time at which the movable object 300 was at a particular position or had a particular velocity or acceleration.

Figure 7:
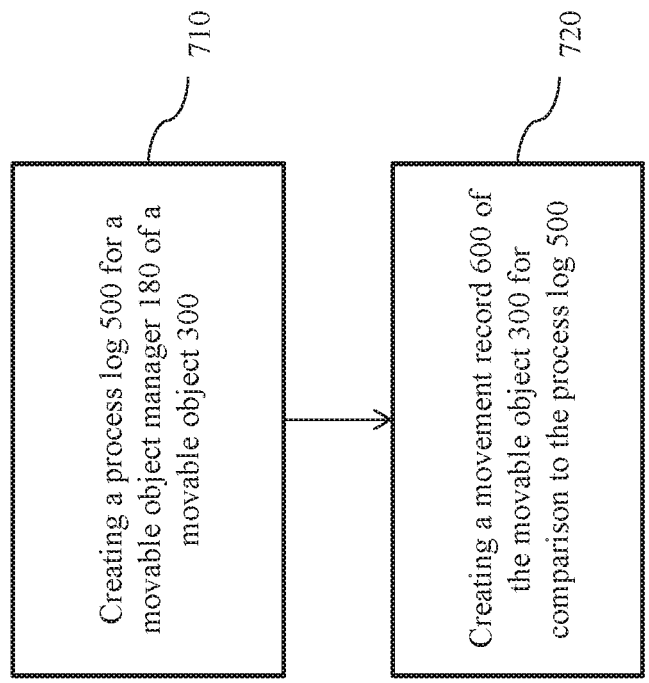
FIG. 7 is an exemplary top level flow chart illustrating an embodiment of a method for tracking performance of a movable object, comprising creating a process log and a movement record in the movable object operation system of FIG. 1.

Turning now to FIG. 7, an exemplary method 700 is shown for tracking performance of a movable object 300. At 701, a process log 500 is created for a movable object manager 180 of the movable object 300. The process log 500 can be created after each session of the movable object 300. A session of the movable object 300 can be defined as a time between the start and end of an operation of the movable object 300. For example, a session of a UAV 320 can be defined as a time between takeoff and landing of the UAV 320. In some embodiments, the process log 500 can be created upon detection of a movable object event 390 (shown in FIG. 9) of the movable object 300, such as a collision or crash of the movable object 300.

The process log 500 can include a first record 510 of application call processes 165 to a movable object interface 170 of the movable object manager 180. The application call processes 165 can be calls made by an application 160 to an interface 170 of a movable object software development kit (SDK). The first record 510 can include, without limitation, a method 511 of the application call processes 165 and a corresponding interface call timestamp 512. The first record 510 can further optionally include parameter values 513 of the application call processes 165. The process log 500 can also include a second record 520 of protocol call processes 255 transmitted to and from the movable object 300, as well as corresponding protocol call timestamps 522. The protocol call processes 255 can be encrypted during creation of the process log 500 for added security. The process log 500 can further include a third record 530 of metadata 60 associated with the movable object 300 (such as metadata 60 of one or more of an imaging device, a gimbal, a remote controller, a mobile device, and a user application associated with the movable object 300).

At 702, a movement record 600 of the movable object 300 is created for comparison to the process log 500. The movement record 600 can be created based on manual entry of movement data 601 of the movable object 300. Preferably, the movement record can be created based on movement data 601 from an IMU 320 or GPS 330 associated with the movable object 300. In some embodiments, corresponding IMU data 325 and/or GPS data 335 can be automatically written to a file or transmitted from the movable object 300 for remote recording of the movement record 600.

A user can advantageously create a set of policies to manage how process logs 500 and movement records 600 are stored in memory. For example, process logs 500 and movement records 600 can be deleted periodically or upon passing a certain storage threshold. In some embodiments, the process logs 500 and movement records 600 can be automatically compressed.

Figure 8:
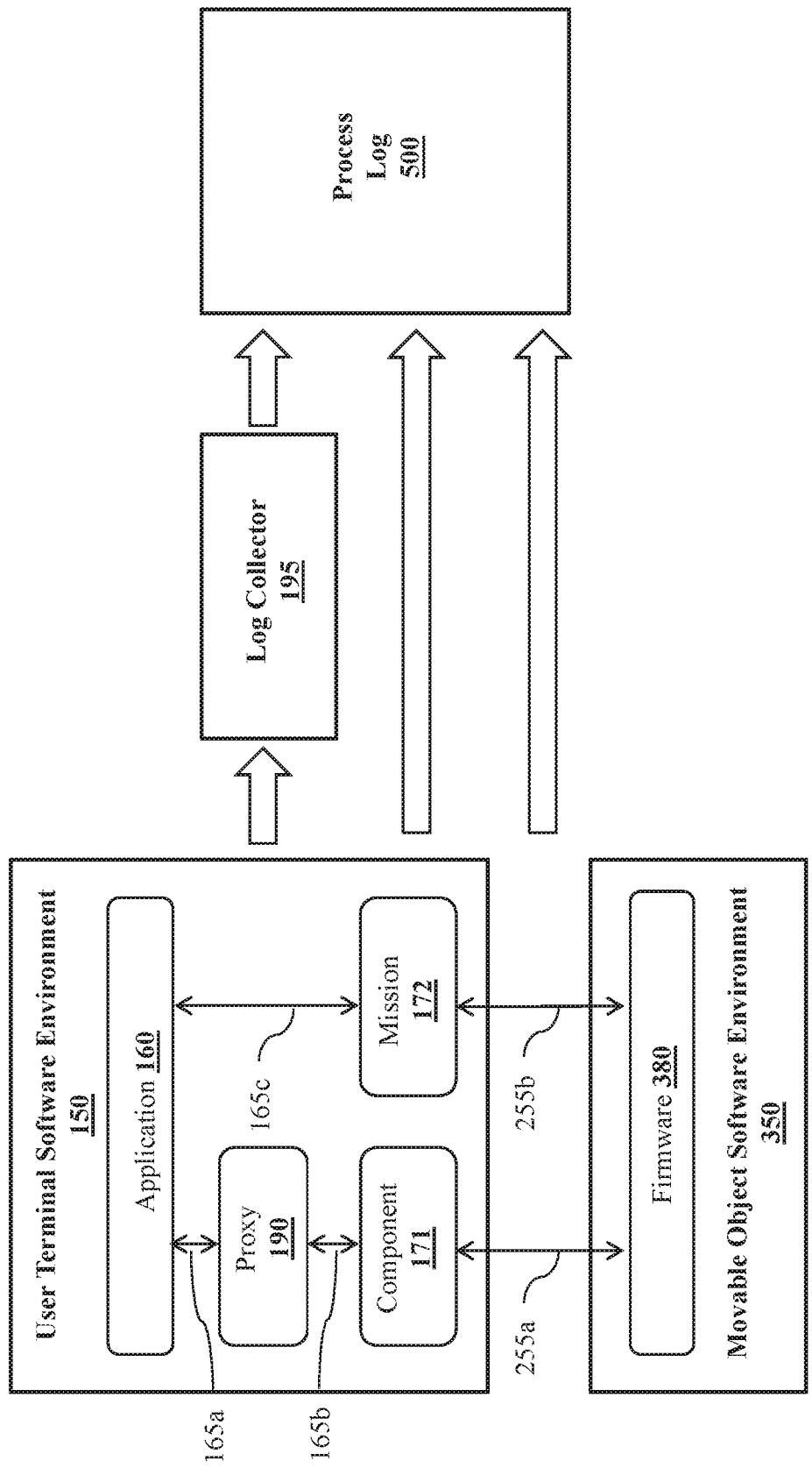
FIG. 8 is an exemplary block diagram illustrating another embodiment of the movable object operation system of FIG. 1, wherein application call processes can be collected using a log collector.

Turning now to FIG. 8, an exemplary embodiment of the present systems and methods for movable object performance tracking is shown. An application 160 is shown as operating in a user terminal software environment 150. In this example, the application 160 invokes application call processes 165a that are received by a proxy 190. The proxy 190 acts as an intermediary that can process and/or filter the application call processes 165a. The application call processes 165b are then relayed from the proxy 190 to a Component 171 object of a movable object SDK (not shown).

For example, the Component 171 object can be a UAV-Rotor object for a UAV 320. The application call processes 165a,b can invoke a StartRotor( ) method that sends instructions via protocol call processes 255a to firmware 380 in a movable object software environment 350 to start a rotor for the corresponding UAV 320. The proxy 190 can further relay the contents of the application call processes 165a,b to a log collector 195. The log collector 195 can accumulate the application call processes 165a,b in a memory, read/write the application call processes 165a,b to a file, and transmit the application call processes 165a,b to other processes, as needed. The log collector 195 can be configured to write the application call processes 165a,b to a process log 500. The log collector 195 can be situated in the user terminal software environment 150, as shown, or in any other suitable environment.

The exemplary application 160 is also shown as invoking an application call process 165c to a Mission 172 object of the movable object SDK. For illustrative purposes, the application call process 165c is shown as invoking the movable object SDK directly without the proxy 190 serving as an intermediary. The Mission 172 object can be, for example, an ObservationMission object that includes a beginMission( ) method. Invocation of the beginMission( ) method triggers a sequence of protocol call processes 255b to the firmware 380 for beginning a sequence of physical actions that constitute an observation mission for the UAV 320. The application call process 165c can be written direct or indirectly to the process log 500. Furthermore, the protocol call processes 255a,b can also be written to the process log 500, as desired.

Figure 9:
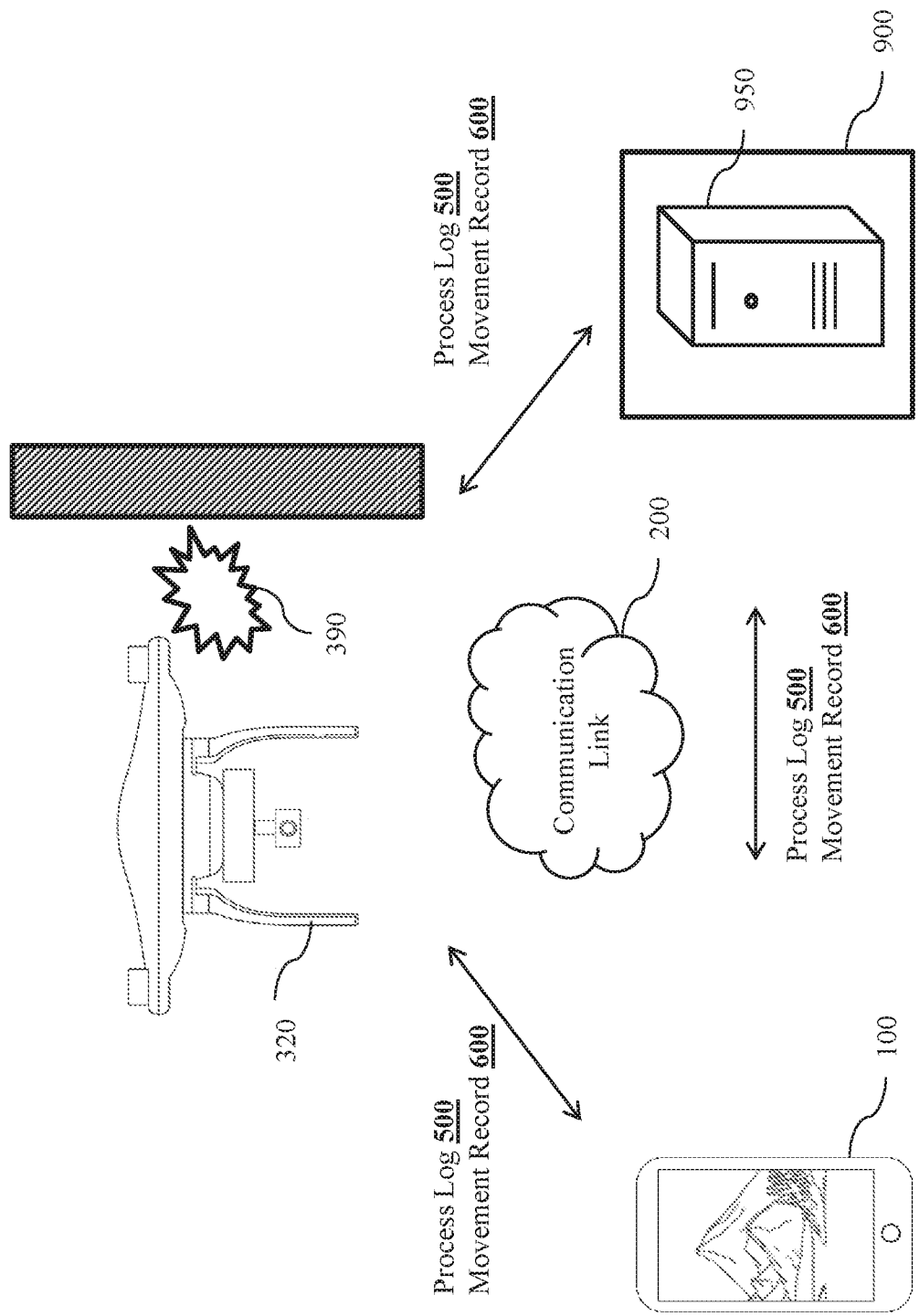
FIG. 9 is an exemplary block diagram illustrating another embodiment of the movable object operation system of FIG. 1, wherein a process log and a movement record can be transmitted to a user terminal or movable object monitoring station upon detection of a crash or collision.

Turning now to FIG. 9, an exemplary movable object event 390 is shown as a crash or collision of a UAV 320. The movable object 300 (or various components thereof) can advantageously be configured to write the process log 500 periodically, so as to avoid loss of data (for example, in the event of sudden destruction of the movable object 300). In some embodiments, the movable object 300 (or various components thereof) can be configured to write the process log 500 upon detection of abnormal or unusual behavior of the movable object 300, indicating that an adverse movable object event 390 could be imminent. In some embodiments, the process log 500 can be written based on an external signal, such as a trigger from the user terminal 100 or other remote location. The process log 500 can be written to a file. The process log 500 can be saved locally (for example, on the user terminal 100 or on the movable object 300) or transmitted to one or more other locations. Similarly, the movement record 600 for the movable object 300 can be stored and/or transferred among one or more locations, as shown.

In some embodiments, the process log 500 and/or the movement record 600 can be transmitted to a movable object monitoring station 900. The movable object monitoring station 900 can be used to monitor performance and/or collect data for one or more movable objects simultaneously. Such monitoring and data collection can advantageously provide a safe repository for such information, which can be used by designers, manufacturers, and users to troubleshoot and improve future movable object performance. In some embodiments, the process log 500 and/or the movement record 600 can be transmitted to the movable object monitoring station 900 upon detection of the movable object event 390. For example, the process log 500 and/or the movement record 600 can initially be stored on the user terminal 100, and be transmitted to the movable object monitoring station 900 upon detection of a collision or crash of the movable object 300. In some embodiments, the user terminal 100 can be equipped with functionality that allows a user to report the collision or crash to the movable object monitoring station 900 when desired by the user.

In some embodiments, the process log 500 and/or the movement record 600 can be synchronized among the movable object 300, the user terminal 100, and/or a remote server 950. Data synchronization advantageously allows the process log 500 and/or the movement record 600 to be kept current at multiple locations, as well as avoid loss or corruption of the information.

Figure 10:
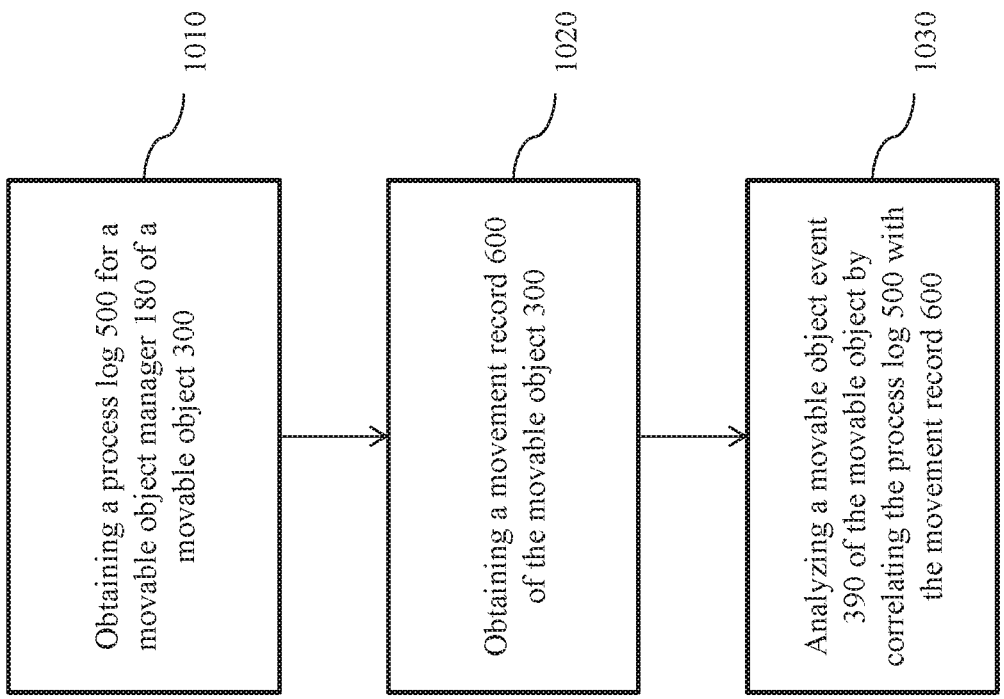
FIG. 10 is an exemplary top level flow chart illustrating an embodiment of a method for movable object event analysis, comprising correlating a process log and a movement record obtained by the movable object operation system of FIG. 1.

Turning now to FIG. 10, an exemplary method 1000 is shown for analysis of movable object events 390 (shown in FIG. 9). At 1001, a process log 500 is obtained for a movable object manager 180 of the movable object 300. As described above with respect to FIG. 7, the process log 500 can include a first record 510 of application call processes 165, a second record 520 of protocol call processes 255, and/or a third record 530 of metadata 60 associated with the movable object 300. At 1002, a movement record 600 of the movable object 300 is obtained for comparison to the process log 500. The movement record 600 can include, for example, IMU data 325 and/or GPS data 335 for the movable object 300.

At 1030, the movable object event 390 is analyzed by correlating the process log 500 with the movement record 600. The analysis can be carried out to determine a cause of the movable object event 390, or, in some cases, rule out suspected causes of the movable object event 390. In some embodiments, correlation of the process log 500 and the movement record 600 can be based on event timestamps, such as an interface call timestamp 512, a protocol call timestamp 522, and/or a movement timestamp 602 for the movable object 300.

The information recorded in the process log 500 is particularly useful for determining whether a movable object event 390 is caused by a user application 160, or by software of the movable object manager 180 (for example, the movable object SDK). The ability to distinguish between these two classes of software errors can be important for determining responsibility for error correction. In some cases, the movable object event 390 is caused neither by the user application 160 nor by software of the movable object manager 180. Such cases are also useful to detect, as the underlying problem can then be attributed to other sources (such as firmware 380 or hardware).

Figure 11:
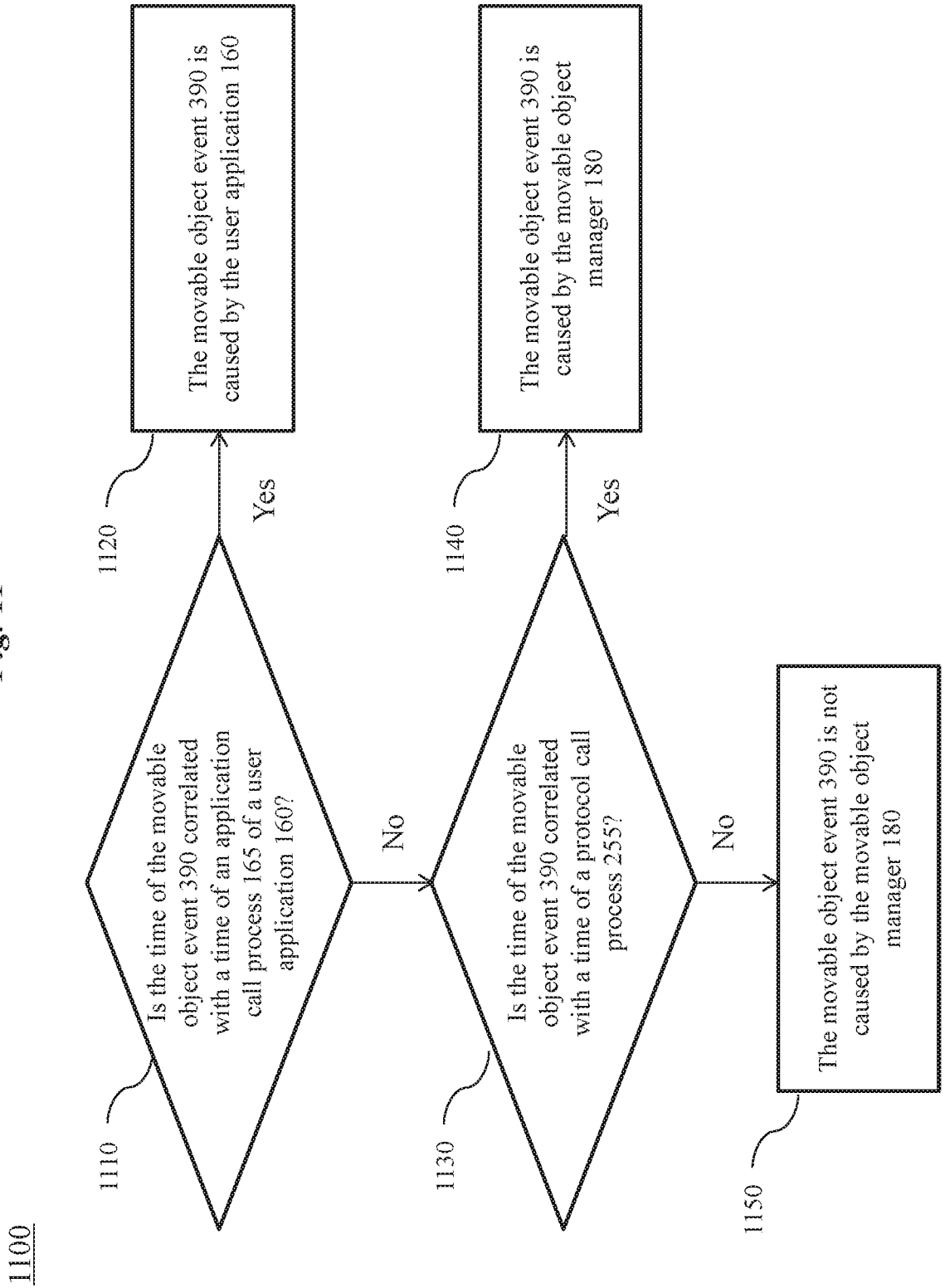
FIG. 11 is an exemplary flow chart illustrating an embodiment of the method of FIG. 10 for correlating a process log and a movement record obtained by the movable object operation system of FIG. 1.

Turning now to FIG. 11, an exemplary decision flow chart 1100 is shown for determining a cause of a movable object event 390 based on various timestamps in the process log 500 and the movement record 600. At 1110, it is determined whether the time of the movable object event 390 is correlated with a time of an application call process 165 of a user application 160. If the time of the movable object event 390 is correlated with the time of the application call process 165, then, at 1120, the movable object event 390 is determined to be caused by the user application 160. Otherwise, at 1130, it is determined whether the time of the movable object event 390 is correlated with a time of a protocol call process 255. If the time of the movable object event 390 is correlated with the time of the protocol call process 255, then, at 1140, the movable object event 390 is determined to be caused (or likely to be caused) by the movable object manager 180. Otherwise, at 1150, it is determined that movable object event 390 is not caused by the movable object manager 180. Appropriate remedial action can subsequently be taken.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method of movable object event analysis, comprising:
   obtaining a process log for a movable object manager of a movable object, the movable object manager operating in a software environment;
   obtaining a movement record of the movable object from two or more sensors including two or more of a global positioning system (GPS) sensor, a motion sensor, an inertial measurement unit (IMU), a proximity sensor, an image sensor, an attitude and heading reference system (AHRS), a radar sensor, a lidar sensor, an ultrasound sensor, and an infrared sensor;
   analyzing a movable object event of the movable object by correlating the process log with the movement record to determine a cause of the movable object event; and
   taking a remedial action based on the determined cause of the movable object event.

2. The method of claim 1, wherein said obtaining the process log comprises obtaining the process log having a first record of application call processes to a movable object interface of the movable object manager, and the first record comprises applications call processes to an interface of a movable object software development kit (SDK).

3. The method of claim 1, wherein said obtaining the process log comprises obtaining the process log having a second record of protocol call processes transmitted to and from the movable object.

4. The method of claim 1, wherein said obtaining the process log comprises obtaining the process log having a third record of metadata associated with the movable object.

5. The method of claim 4, wherein the third record comprises metadata of at least one of an imaging device, a gimbal, a remote controller, a mobile device, and a user application associated with the movable object.

6. The method of claim 1, wherein said obtaining the process log comprises obtaining the process log upon detection of the movable object event and said obtaining the process log comprises obtaining the process log upon detection of a collision or crash of the movable object.

7. The method of claim 1, wherein the two or more sensors include an inertial measurement unit (IMU) of the movable object and a global positioning system (GPS) of the movable object.

8. The method of claim 1, wherein said analyzing comprises correlating a time of the movable object event in the movement record to a time of an entry in the process log and said analyzing comprises detecting a cause of a collision or crash of the movable object.

9. The method of claim 8, wherein said detecting comprises determining that the movable object event is caused by a user application when the time of the movable object event is correlated with a time of an application call process of the user application, or, determining that the movable object event is caused by a movable object interface of the movable object manager when the time of the movable object event is correlated with a time of a protocol call process, but not correlated with a time of an application call process.

10. The method of claim 1, wherein the movable object is an unmanned aerial vehicle (UAV).

11. A movable object, comprising:
one or more processors configured for:
creating a process log for a movable object manager of the movable object, the movable object manager operating in a software environment;
creating a movement record of the movable object from two or more sensors including two or more of a global positioning system (GPS) sensor, a motion sensor, an inertial measurement unit (IMU), a proximity sensor, an image sensor, an attitude and heading reference system (AHRS), a radar sensor, a lidar sensor, an ultrasound sensor, and an infrared sensor for comparison to the process log; and
in response to detecting an event of collision or crash of the movable object:
transmitting the process log and the movement record to a user terminal or a movable object monitoring station; and
taking a remedial action based on a cause of the movable object event determined by the user terminal or the movable object monitoring station by correlating the process log with the movement record.

12. The movable object of claim 11, wherein said creating the process log comprises creating the process log having a first record of application call processes to a movable object interface of the movable object manager and first record comprises applications calls processes that are application call processes to a movable object component.

13. The movable object of claim 11, wherein said creating the process log comprises creating the process log having a second record of protocol call processes transmitted to and from the movable object and encrypting the protocol call processes.

14. The movable object of claim 11, wherein said creating the process log comprises creating the process log having a third record of metadata associated with the movable object and the third record comprises metadata of at least one of an imaging device, a gimbal, a remote controller, a mobile device, and a user application associated with the movable object.

15. The movable object of claim 14, wherein said creating the process log comprises creating the process log upon detection of an event that is a collision or crash of the movable object.

16. The movable object of claim 11, wherein the movable object is an unmanned aerial vehicle (UAV).

17. A system of movable object event analysis, comprising:
one or more microprocessors; and
an analyzer running on the one or more microprocessors, wherein the analyzer operates to:
obtain a process log for a movable object manager of a movable object, the movable object manager operating in a software environment;
obtain a movement record of the movable object from two or more sensors including two or more of a global positioning system (GPS) sensor, a motion sensor, an inertial measurement unit (IMU), a proximity sensor, an image sensor, an attitude and heading reference system (AHRS), a radar sensor, a lidar sensor, an ultrasound sensor, and an infrared sensor;
analyze a movable object event of the movable object by correlating the process log with the movement record to determine a cause of the movable object event; and
take a remedial action based on the determined cause of the movable object event.

18. The system of claim 17, wherein said analyzer operates to obtain the process log having a first record of application call processes to a movable object interface of the movable object manager and the first record comprises applications calls processes that are application call processes to a movable object mission.

19. The system of claim 17, wherein said analyzer operates to obtain the process log having a second record of protocol call processes transmitted to and from the movable object.

20. The system of claim 17, wherein said analyzer operates to obtain the process log having a third record of metadata associated with the movable object and the third record comprises metadata of at least one of an imaging device, a gimbal, a remote controller, a mobile device, and a user application associated with the movable object.

* * * * *